(12) United States Patent
Sans

(10) Patent No.: US 8,579,769 B2
(45) Date of Patent: Nov. 12, 2013

(54) STEP-CYCLING APPARATUS

(76) Inventor: William Sans, Miami, FL (US)

( * ) Notice: Subject to any disclaimer, the term of this patent is extended or adjusted under 35 U.S.C. 154(b) by 545 days.

(21) Appl. No.: 12/723,329

(22) Filed: Mar. 12, 2010

(65) Prior Publication Data

US 2011/0224047 A1     Sep. 15, 2011

(51) Int. Cl.
| A63B 22/04 | (2006.01) |
| A63B 22/06 | (2006.01) |
| A63B 69/16 | (2006.01) |
| B62M 1/00 | (2010.01) |
| B62M 5/00 | (2006.01) |

(52) U.S. Cl.
USPC ............... 482/52; 482/57; 280/221; 280/257

(58) Field of Classification Search
USPC ............. 482/51–53, 57–65, 111–112, 70–71, 482/92; 280/252, 256–257, 278, 287, 210, 280/221, 253, 259–261
See application file for complete search history.

(56) References Cited

U.S. PATENT DOCUMENTS

| 1,477,544 | A | * | 12/1923 | D'Antonio | 280/221 |
| 2,108,868 | A | * | 2/1938 | Rumsey | 280/1.165 |
| 5,016,872 | A | * | 5/1991 | Lee | 482/58 |
| 5,520,401 | A | * | 5/1996 | Mohseni | 280/221 |
| 6,206,387 | B1 | * | 3/2001 | Tsai | 280/87.041 |
| 6,334,838 | B1 | * | 1/2002 | Lee | 482/51 |
| 6,764,088 | B2 | * | 7/2004 | Hung | 280/221 |
| 6,769,706 | B2 | * | 8/2004 | Chow | 280/256 |
| 8,056,915 | B2 | * | 11/2011 | Pang | 280/221 |
| 8,128,111 | B2 | * | 3/2012 | Scolari et al. | 280/221 |
| 8,220,814 | B1 | * | 7/2012 | Riviglia et al. | 280/252 |
| 2007/0235973 | A1 | * | 10/2007 | Lin | 280/217 |
| 2011/0057412 | A1 | * | 3/2011 | Owoc et al. | 280/257 |

* cited by examiner

*Primary Examiner* — Oren Ginsberg
(74) *Attorney, Agent, or Firm* — Albert Bordas, P.A.

(57) ABSTRACT

An apparatus comprising, a paddle lever, a hinge joint, the hinge joint pivotally attached to the paddle lever, a hydraulic piston, the hydraulic piston pivotally attached to the paddle lever, a crankshaft, a piston bar, the piston bar pivotally attached to the paddle lever on a first end and to the crankshaft on a second end, a chain assembly, the chain assembly interlocked to the crankshaft, and a wheel, the wheel attached to the chain assembly by a rear axle, wherein a force pushes down the paddle lever hinged on the pivot joint, the force is transmitted to both the hydraulic piston and the crankshaft at the same time therefore rotating the wheel. A method of transportation comprising, using human force to simultaneously move a crankshaft and a hydraulic piston, whereby a wheel is rotated.

17 Claims, 8 Drawing Sheets

STEP-CYCLING APPARATUS

FIELD OF THE INVENTION

The present invention relates to the art of step-cycling.

BACKGROUND OF THE TECHNOLOGY PATENT

A bicycle, also known as a bike, push-pull bike or cycle, is a pedal-driven, human-powered, single-track vehicle, having two wheels attached to a frame, one behind the other. Bicycles were introduced in the 19th century and now they are the principal means of transportation in many regions. They also provide a popular form of recreation and have been adapted for such uses as children's toys, adult fitness, military and police applications, courier services, and bicycle racing.

The basic shape and configuration of a typical upright bicycle has changed little since the first chain-driven model was developed around 1885. Many details have been improved, but the same shape, principle, and design has remained. Two wheeled bicycles need to be moving in order to counter gravity or risk falling on the side; thus, staying stationary can not be accomplished with two wheels. This constant movement is a problem if the bike is going to be used as a touring vehicle rather than a sports-machine, since the bicycle needs to be permanently moving.

It has also been proven that bicycling is the one exercise that uses the upper leg muscles and forces cardiovascular performance. However, it has also been shown that it gives much strain to the knee joints. Whether an actual bike or a stationary bike is utilized, cycling is not an exercise for someone with bad knees because the user sits at an angle, putting force on the knees and causing stress on the joints.

In order to ensure correct hip and knee alignment, providing an optimal, impact free workout, the indoor stepping machine was created. This machine was engineered to promote the development of stabilizer muscles and correct standing posture, thus improving balance. The indoor static stepping machine is the most practical, efficient, and biomechanically sound stepping machine available today. Thorough research of all aspects and parameters of stepping and the biomechanical efficiency of the static of stepping shows to be the most beneficial exercise for humans. The indoor stepping machine has allowed the American public to achieve their essential fitness goals in spite of the overwhelming demands and time constraints of today's society.

The issue with these stepping machines is that they do not move or are static. The pubic would like to have all the biomechanical benefits of a stepping machine, but at the same time, be able to go places and enjoy the scenery outdoors. This is something that the sitting bicycle allows, a means to travel long distances outdoors, a means to work, a means of true transportation, and a recreational vehicle to exercise. The stepping exercise machine simply does not provide such benefits.

One solution to this problem is the creation of a machine that combines the elements of stepping with the benefits of mobility. There is a need in the cycling marketplace to have an apparatus that a person is able to ride as a means of transportation and provide low-impact exercise outdoors. Moreover, in the stepping industry, it would be desirable to progress from the dull static stepping machine, exercising in the same place, to a movable machine that incorporates the biomechanical elements of stepping.

BRIEF DESCRIPTION OF THE SEVERAL VIEWS OF THE DRAWINGS

The foregoing summary, as well as the following detailed description of the technology, will be better understood when read in conjunction with the appended drawings. For illustrating the technology, the figures are shown in the embodiments that are presently preferred. It should be understood, however, that the technology is not limited to the precise arrangements and instrumentalities shown. In the drawings.

DESCRIPTION OF THE TECHNOLOGY

Figure 1:
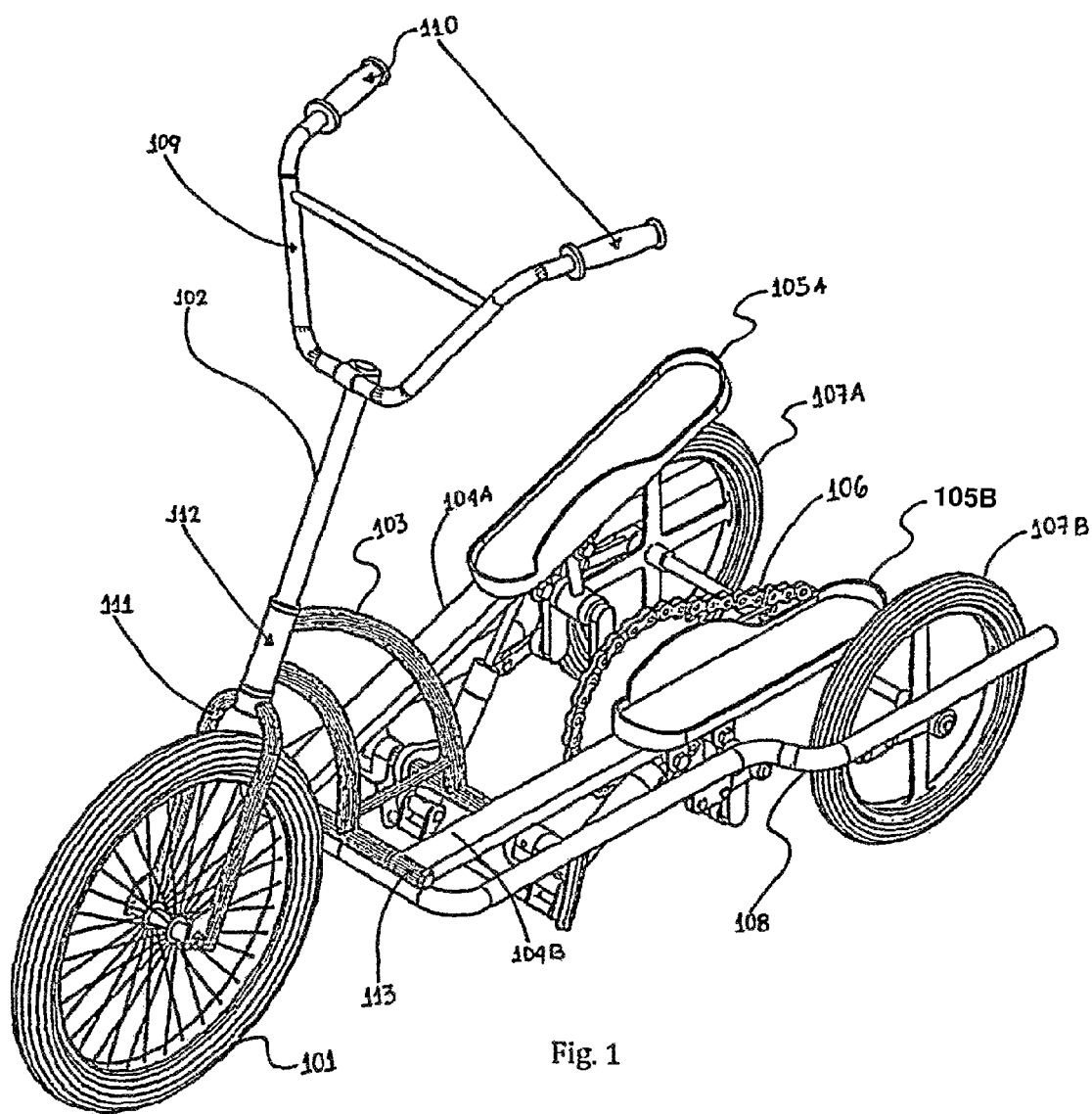
FIG. 1 depicts at least one three-dimensional (3D) embodiment of the technology, where the step-cycling apparatus is depicted in its entirety from above.

The present technology depicts an inventive solution to the fore mentioned issues related to static stepping machines.

Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art. Many of the techniques and procedures described, or referenced herein, are well understood and commonly employed using conventional methodology by those skilled in the art. As appropriate, procedures involving the use of commercially available kits and reagents are generally carried out in accordance with manufacturer defined protocols and/or parameters, unless otherwise noted.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Figure 2:
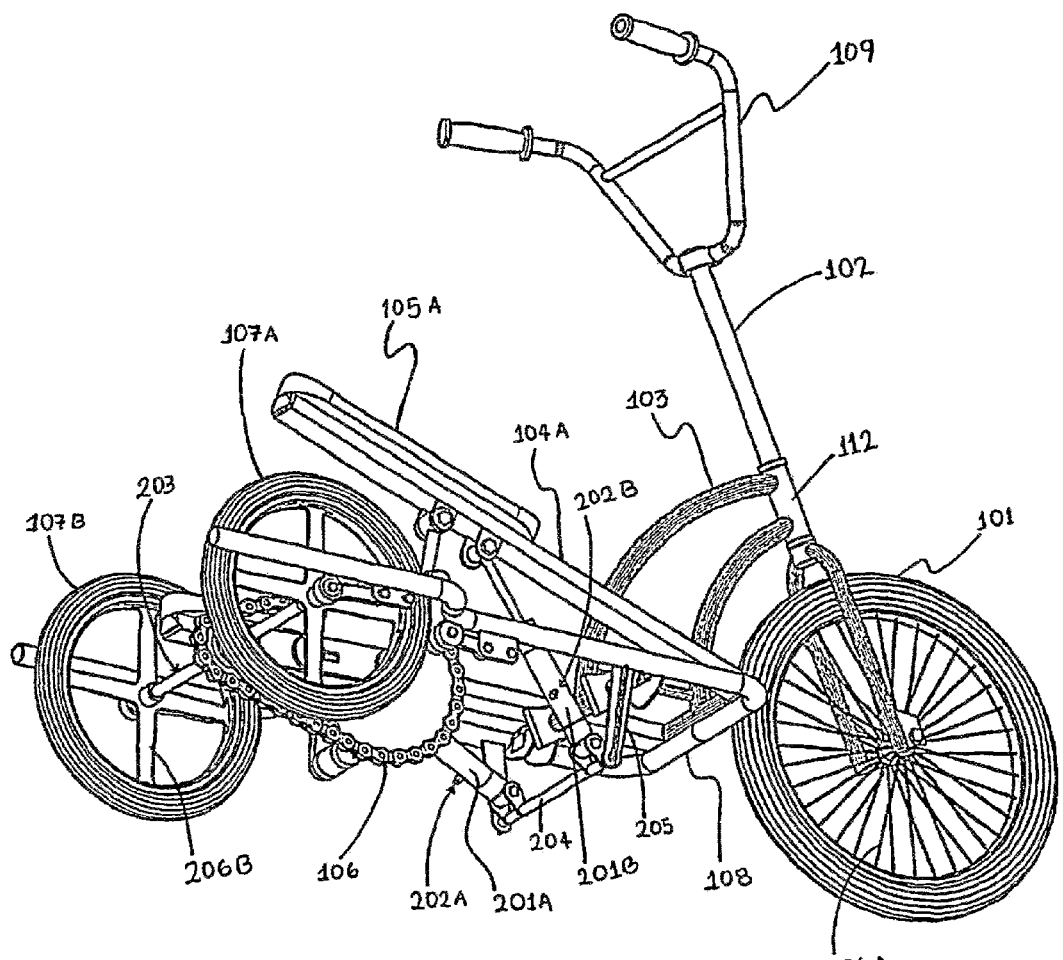
FIG. 2 depicts least one 3D embodiment of the technology, where the step-cycling apparatus shows the driving elements from underneath.
Figure 3:
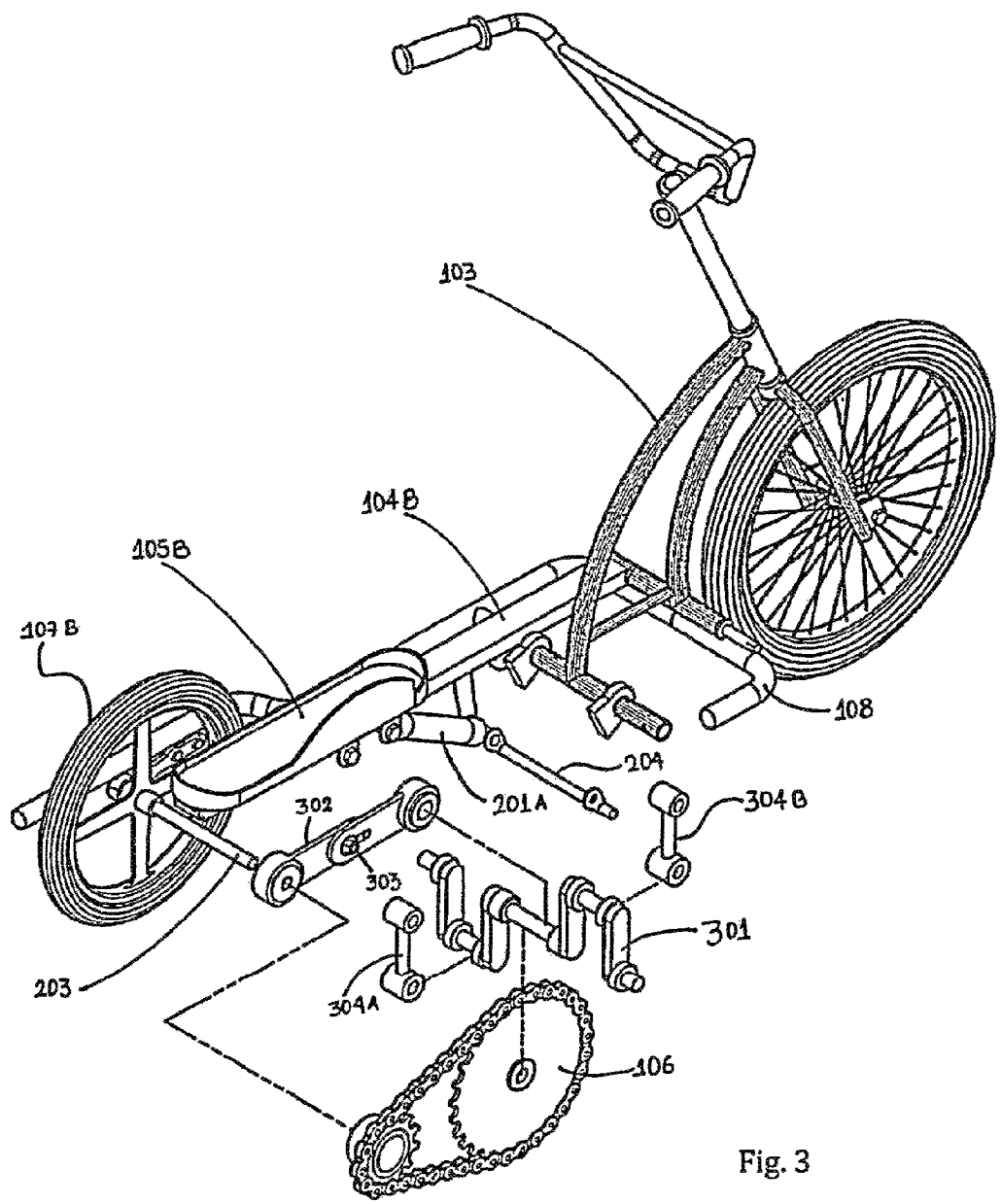
FIG. 3 depicts an exploded-view of at least one embodiment of the technology, where the inner workings of the technology are detailed.
Figure 4:
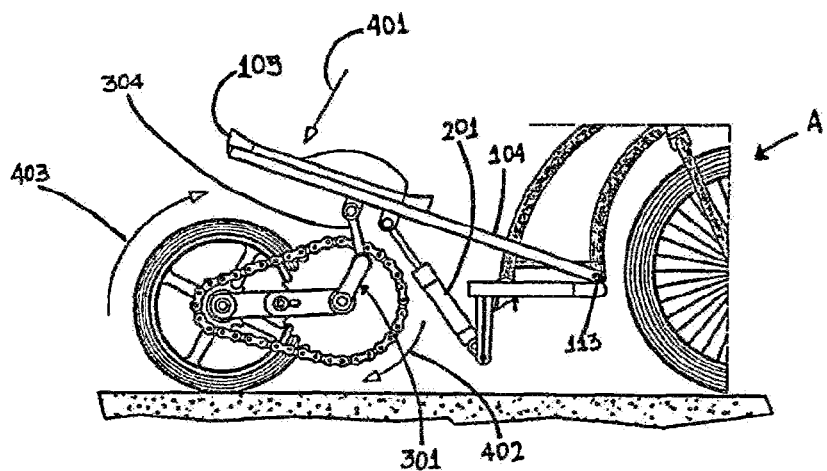
FIG. 4 depicts a side-view of at least one embodiment of the technology, where it is depicted how the apparatus functions as one foot-platform, where the crankshaft is pushed down from the starting position.
Figure 5:
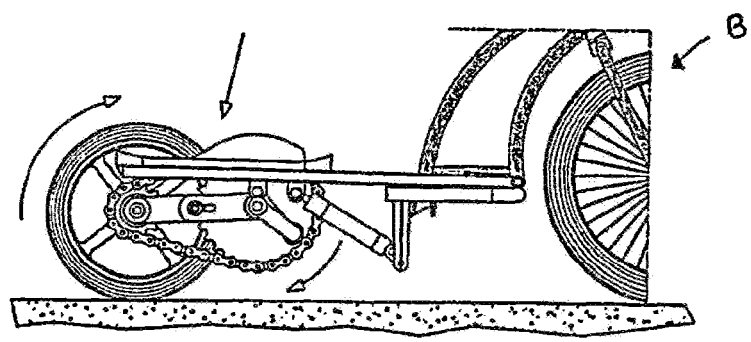
FIG. 5 depicts a side-view of at least one embodiment of the technology, where it is depicted how the apparatus functions as the foot-platform is pushed further down to the bottom position and the crankshaft moves one quarter revolution.
Figure 6:
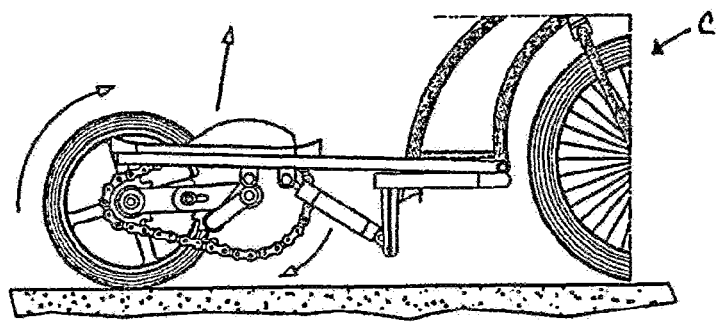
FIG. 6 depicts a side-view of at least one embodiment of the technology, where it is depicted how the apparatus functions as the foot-platform is pushed up (with the force of the other platform) from the bottom position and the crankshaft moves another quarter revolution.
Figure 7:
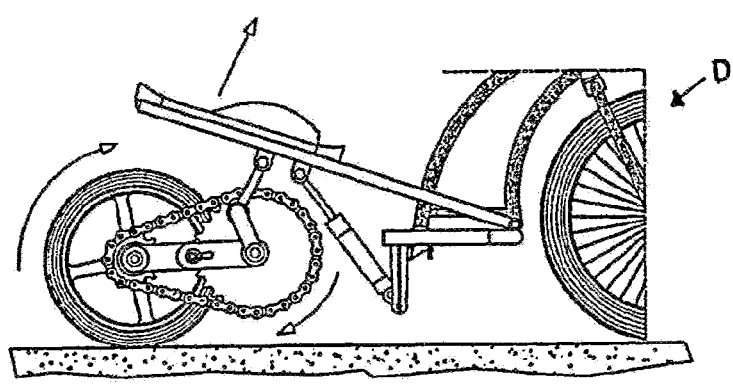
FIG. 7 depicts a side-view of at least one embodiment of the technology, where it is depicted how the apparatus functions as the foot-platform is pushed further up (with the force of the other platform) to starting position and the crankshaft moves the final quarter revolution to complete the cycle, and the cycle starts over.

FIG. 1 depicts at least one embodiment of the invention in 3D, comprising the front wheel 101, the steering mechanism 102, the vertical frame 103, the horizontal frame 108, the levers hinge joint 113, the foot-platform 105A and 105B, the paddle levers 104A and 104B, the back wheels 107 A and 107B, the chain assembly 106. The steering mechanism 102, further comprising the steering 109, the fork 111, the head tube 112, and the handlebars 110. FIG. 2 further depicts an embodiment of the invention in 3D showing a different prospective, further comprising, the rear axle 203, the adjustable hydraulic pistons 201A and 201B, the piston valves 202A and 202B, piston stabilizer bar 204 and the connecting rods 304A and 304B, as shown in FIG. 3.

Also seen in FIG. 2 is supporting bar 205, which extends downwardly from horizontal frame 108 to piston stabilizer bar 204.

In at least one embodiment of the invention, as depicted in FIG. 2, the step-cycling apparatus accomplishes true variable resistance. First, by using at least one adjustable valve 202A and 202B, it enables the user to adapt the step velocity/intensity in accordance with body weight or exercise intensity. Second, by turning the variable resistance knobs 202A and 202B the adjustable hydraulic pistons 201A and 201B allows the step-cycling apparatus to respond to one's every step (at any given intensity setting, the force exerted by the user will equal the force returned by the machine) each leg independently. This was also made in order to accommodate disabled individuals or individuals in physical therapy that need to exercise one leg more over the other.

The invention herein is mainly constructed of an aluminum alloy that not only makes it durable but also extremely lightweight. Other materials that can be used for the same purpose to achieve the same result are steel, aluminum, titanium alloys and composite materials, such as carbon fiber or Kevlar. The wheels 101 and 107A and 107B are made of regular bicycle rubber (inner tubing or tubeless can be used) surrounding an aluminum radial wheel frame with at least one spoke 206. It is understood that a person skilled in the arts may modify the invention herein to accommodate two wheels or four wheels, for the same purpose to achieve the same result. The foot platforms 105A and 105B were made of plastic covered with rubber in order to give grip to the shoes. In one embodiment of the invention, the foot platforms 105A and 105B can be accommodated for individuals with no legs by adapting the footrest to fit a prosthetic.

Figure 8:
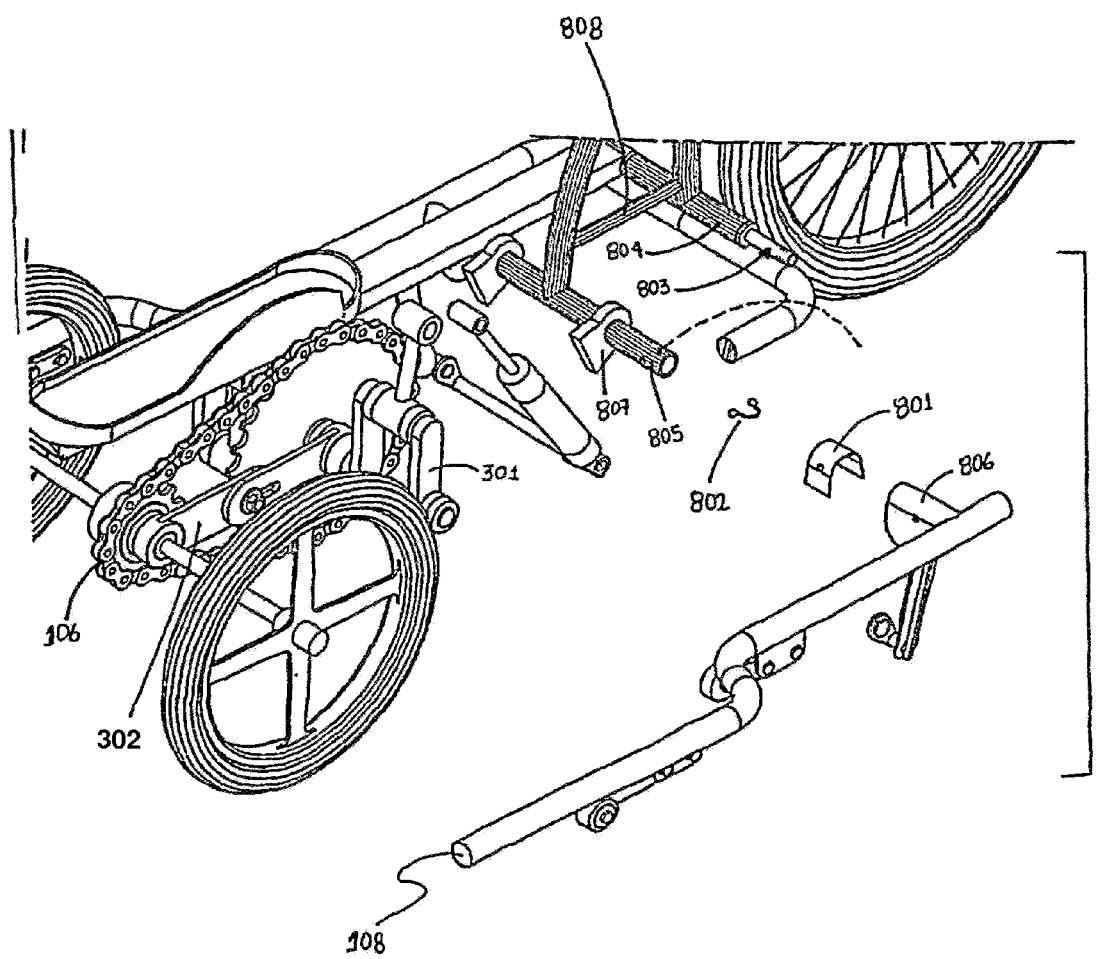
FIG. 8 depicts an exploded-view of at least one embodiment of the technology, where it is depicted how the retraction engagement system works in detail.

The arched vertical frame 103 is linked to the steering 102 at the head tube 112 and as depicted in FIG. 8, with horizontal bars 804 and 805 linked together with cross bar 808. This configuration was created mainly to counter the stresses generated by the forces the user creates from stepping. The horizontal frame 108 links the vertical frame 103 at the hinge joint 113. This link was accomplished through welding, but other attachments, such as bolts and nuts, can be used for the same purpose to accomplish the same result.

In one embodiment of the technology, FIG. 4-7 depicts the dynamics and hydro mechanical aspects of the invention. The user applies a force 401 on to the foot-platform 105, which in turn is attached to the paddle levers 104A and 104B. As force 401 pushes down from the starting position, the paddle levers 104A hinge at the hinge joint 113 and, in turn, the force is transmitted both to the hydraulic piston 201A, through connecting rod 304A, and to the crankshaft 301 at the same time. The force is therefore divided and shared between the hydraulic piston 201A and the crankshaft 301 through connecting rod 304. Because of this configuration, the user is able to move forward since the interlocked crankshaft 301 rotates 402 the chain assembly 106, which is further interlocked with the rear axle 203 and in turn turns the back wheels 107 to create the forward motion 403. The crankshaft 301 also, pushes the other piston 201B up to starting position in order for the cycle to start over and continue again. The apparatus, therefore, combines not only the translational motion of the wheels 403, but also the resistance of the adjustable hydraulic piston 201A and 201B, giving the user a tailored exercise in a transportation vehicle. Interlocked herein means to become locked together or interconnected, to lock together, unit or to connect so that the motion or operation of any part is constrained by another.

At least one embodiment of the complete dynamics of the invention is as follows. The paddle lever 104A transmits the response from the loads at the top position A of the cycle in FIG. 4 to the adjustable hydraulic piston 201A, which is fully extended at position A. Simultaneously, the paddle lever 104A transmits the response from the loads at the top position A of the cycle FIG. 4 to the crankshaft 301 which is on the top of the cycle at position A. Then, at FIG. 5, bottom position B, the adjustable hydraulic piston 201A becomes fully compressed, and the adjustable hydraulic piston 201B is fully extended. The crankshaft 301 keeps rotating at position C in FIG. 6 because it receives rotation from the second paddle lever 104B as it receives a load and the adjustable hydraulic piston 201B becomes fully compressed. Finally, the crankshaft 301 begins to push the paddle lever 104A up again to position D at FIG. 7 in order to complete the cycle at position A.

One of the inventive elements of the technology is the smooth adjustable hydraulic cylinder resistance. The unique resistance adjustment valves 202A and 202B on the hydraulic cylinder pistons 201A and 201B not only allow one to vary user resistance, they allow the user to customize resistance for each 201A and 201B arm independently.

There are many configurations of hydraulic pistons 201A and 201B that can be used for the same purpose to accomplish the same result, such as water hydraulics and multi-stage telescoping cylinders. The simplest actuator configuration is a single-acting cylinder, where fluid is ported to one side of the piston, producing output force and motion only in one direction. Gravity or external springs return the piston to its starting position as the fluid is returned to the reservoir. Another example is a double-acting cylinder that ports fluid to either side of the piston to produce force/motion when extending and retracting the piston rod. Yet another example is a double-end rod cylinder that adds a piston rod extending through the cylinder's rear end cap. In order to further enhance the control hydraulics of pistons 201A and 201B, control electronics associated with hydraulic cylinders help increase the performance. Another embodiment includes using electro hydraulic proportional (servo) pistons and sophisticated feedback sensors integrated into the cylinder. More common are directional control valves that actuate cylinders automatically or manually.

In FIG. 3, by using adjustable hydraulic pistons 201A and 201B, the technology herein solves the issue of road shock transmitted from the rear tires 107A and 107B to the paddle levers 104A and 104B. Bumps are transmitted from the rear tires 107A and 107B, through the rear axle 203 to the stabilizer bar 302, through the crankshaft 301, and absorbed by adjustable hydraulic pistons 201A and 201B that are attached to the paddle levers 104A and 104B. As seen in FIG. 3, another use of the stabilizer bar 302 is to adjust the tension, using a nut 303, between the crankshaft 301 and the chain assembly 106 in order to avoid the loss of tension.

Figure 9:
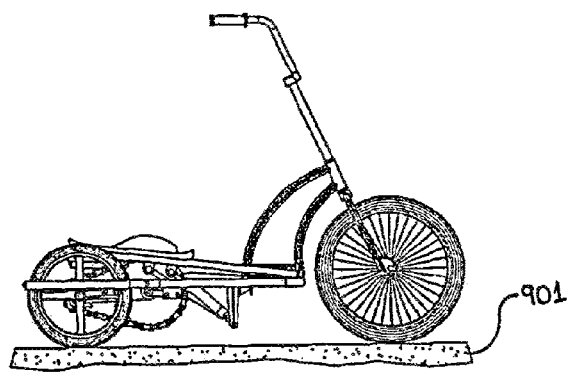
FIG. 9 depicts a side view of at least one embodiment of the technology, where it is depicted how the apparatus stands before retracting.
Figure 10:
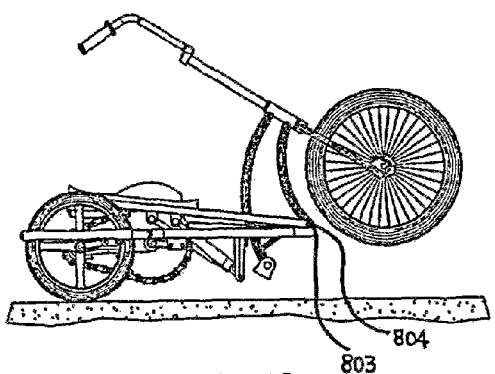
FIG. 10 depicts a side view of at least one embodiment of the technology, where it is depicted how the apparatus begins retraction.
Figure 12:
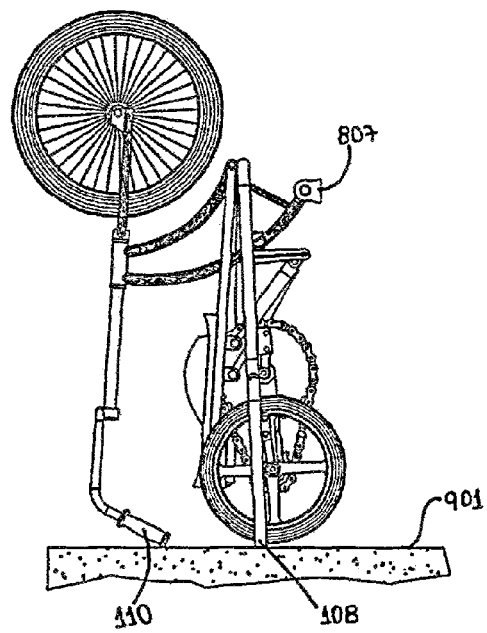
FIG. 12 depicts a side view of at least one embodiment of the technology, where it is depicted how the apparatus stands up-right in a final retracted position.
Figure 11:
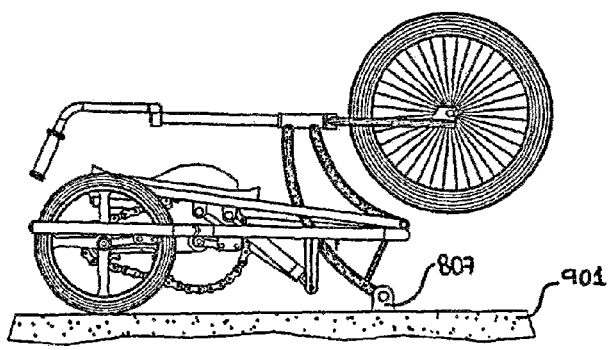
FIG. 11 depicts a side view of at least one embodiment of the technology, where it is depicted how the apparatus appears at the final retraction position.
Figure 13:
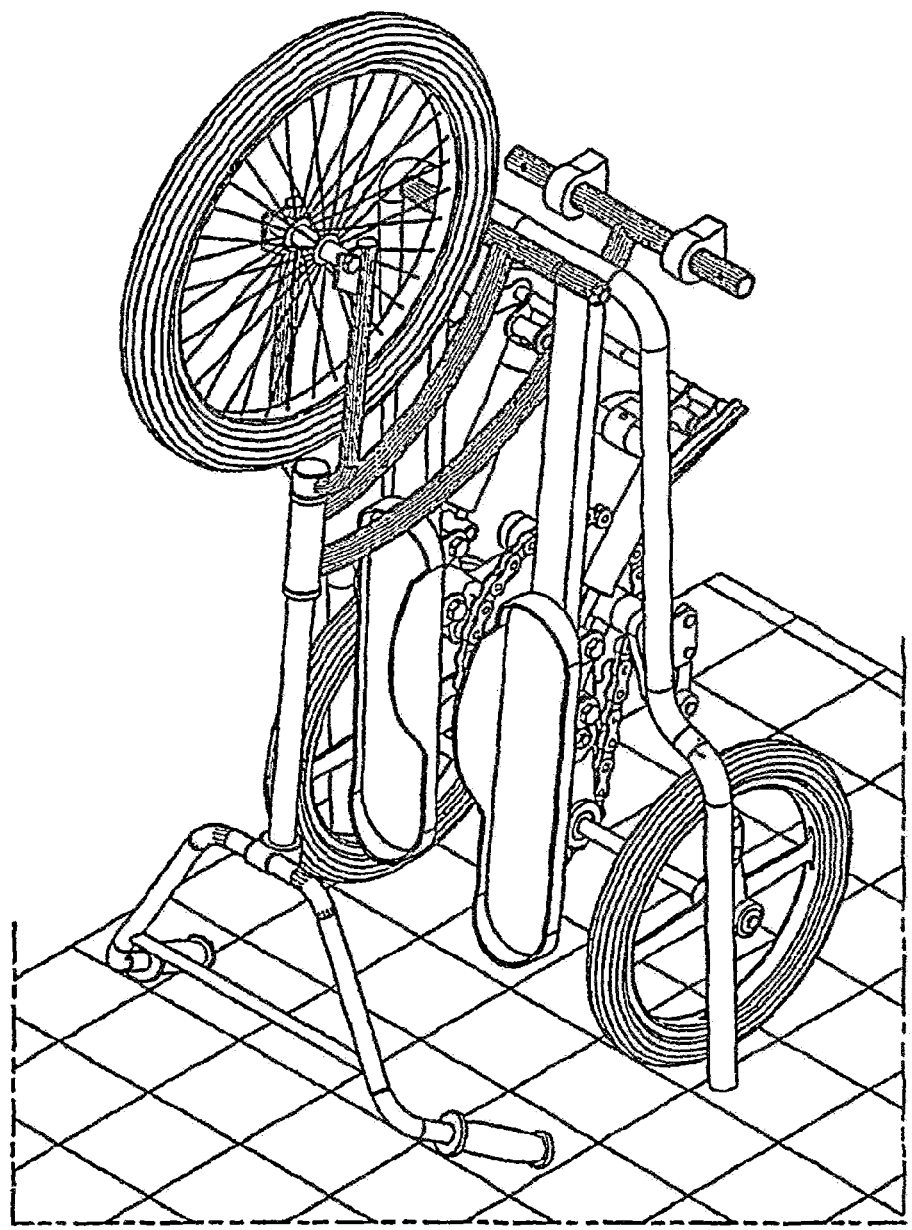
FIG. 13 depicts a 3D view of at least one embodiment of the technology, where it is depicted how the apparatus stands up-right in a final retracted position.
Figure 14:
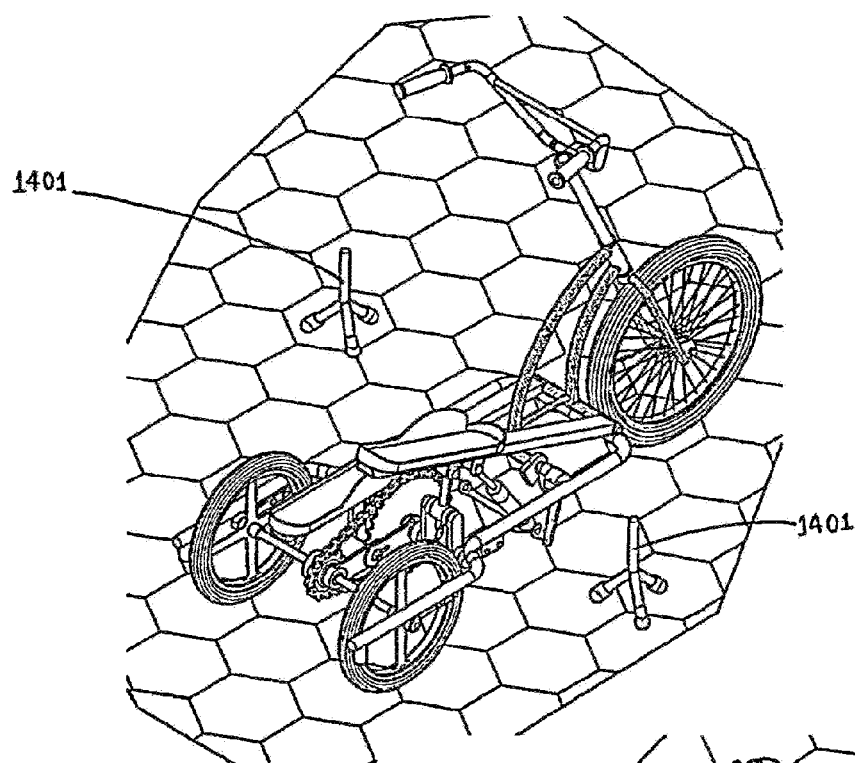
FIG. 14 depicts a 3D view of at least one embodiment of the technology, where it is depicted how the apparatus functions on the ground.

Most of the people using exercise-machines of any kind are space restrained. It was important for the inventor herein to develop a step-cycling apparatus that was easy to store. In at least one embodiment of the technology as seen in FIG. 8, the inventive apparatus contains a release mechanism comprised of at least one U-shaped spring pin 802 and spring pin plate 801. The purpose of having this U-shaped spring pin 802 is to release the horizontal bar 805 at the release channel 806. Once the U-shaped spring pin 802 is pressed, with the aid of spring pin plate 801, the entire assembly begins to collapse from the upright position of FIG. 9, rotating along frame hinge 803 as seen in FIG. 10, finally to rest at the folded position of FIG. 11. The step-cycling apparatus in a folded position may rest on rubber rests 807 over surface 901, as seen in FIG. 11, or vertically as seen in FIG. 12 and FIG. 13 using the horizontal frame 108. As depicted in FIG. 13, weight and portability makes for easy storage and enables the owner to take it wherever they need to be.

After years of research, the inventor herein finally found that a step-cycling apparatus was the perfect answer to the knee stress issues described above. Stepping or pushing at a force of low magnitude gives sufficient resistance and thus helps build muscle and bone mass while at the same time the same apparatus takes you places. These are the principal advantages the step-cycling invention herein has over other static exercise machines.

Fitness experts agree that a weight-bearing workout is the best way to improve conditioning, increase bone density, strengthen muscles, and burn calories efficiently. The step-cycle FIG. 1 provides for a Low-Impact Workout solution. Despite providing a good weight-bearing workout, the step-cycle apparatus FIG. 1 is very low impact. This means less stress on your joints during cross training exercises because your feet never leave the pedals and therefore do not experience high impact. The step-cycle apparatus FIG. 1 herein provides an excellent cardiovascular workout, a key part of overall fitness. Whether you want to lose weight, firm up your body, or a combination of both, incorporating cardiovascular exercise into your workout routine is critical to your long-term success. The many benefits that the step-cycling apparatus of FIG. 1 provide are improved blood circulation, better bone and muscle strength, and increase in metabolism and decrease in cellulite.

Figure 15:
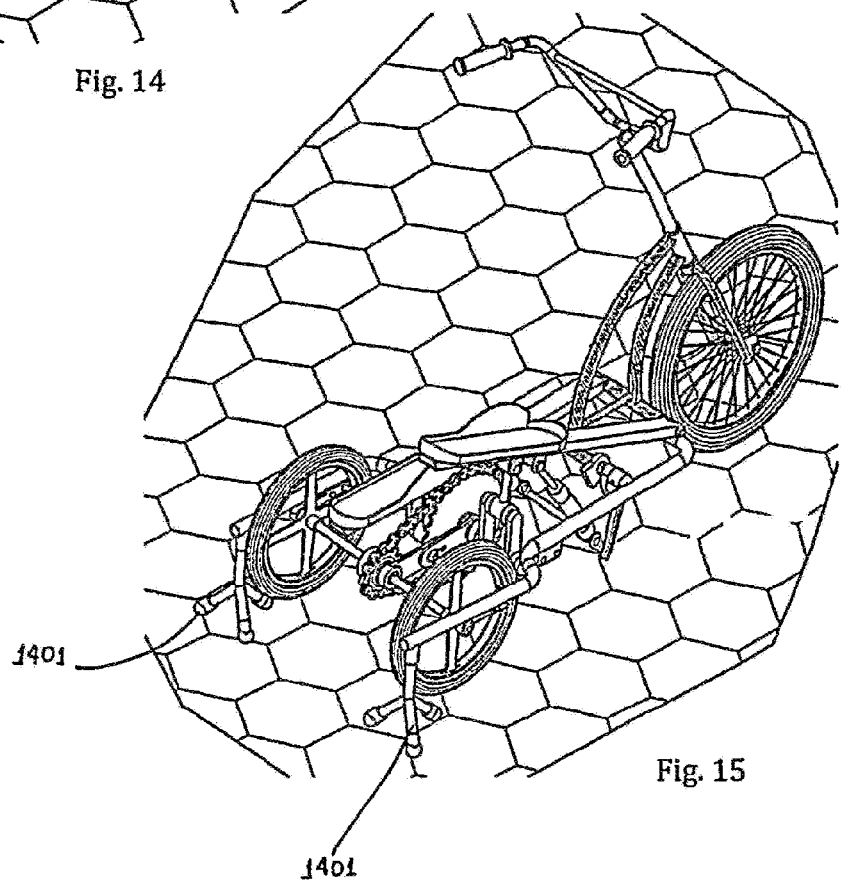
FIG. 15 depicts at least one embodiment of the technology, where it is depicted how the apparatus functions to mimic a static exercise machine with the help of lift accessories to raise the apparatus into a static position.

Most people live busy lives and do not have several hours per day to devote to total body exercise, so step-cycling lets them get in a good workout in a minimal amount of time. Due to lack of time or due to many other hassles, most people are not able to go outdoors to exercise. Having step-cycling exercise equipment indoors easily eliminates this problem. FIG. 15 depicts at least one embodiment of the invention and how it would be issued indoors if the user so required it. The user would lift the step-cycle apparatus of FIG. 1, by using at least one lift accessory 1401. The user would place the lift accessory on the horizontal frame 108 to lift the entire apparatus in order for the back wheels 107A and 107B to clear the ground. Indoors step-cycling allows the user to also do other things, like read or watch TV.

People can easily carry out their workout on the step-cycling machine while watching the scenery or simply enjoying the outdoors. Motivation to exercise is a big issue for many people, but by using step-cycling apparatus FIG. 1, users will enjoy an easier time staying motivated to get on their machine. This is because the user can vary their workout tremendously, depending on the amount of intensity the user wants, and use the step-cycling apparatus as a means to go places. Being outdoors helps reduce boredom and increase the likelihood that the user will use step-cycling for low-impact cross training on a regular basis.

Another issue with today's bicycles is chair discomfort. The step-cycling cross training apparatus FIG. 1 eliminates the chair, thus a more intense workout of the legs. Furthermore, the inventive technology allows for the user to be able to increase resistance, increase the incline, or a combination of both. This upright posture is always maintained by the user, placing the user's shoulders back, chin up, back straight, and abdominals tight. A better workout is created because upright position does not encourage users to lean forward over the handles 110. Instead, the apparatus of FIG. 1 makes sure the body weight is being carried by the lower body throughout the exercise.

It will be appreciated by those skilled in the art that changes could be made to the embodiments described above without departing from the broad inventive concept thereof. It is understood, therefore, that this technology is not limited to the particular embodiments disclosed, but it is intended to cover modifications within the spirit and scope of the present technology.

I claim:

1. A step-cycling apparatus, comprising:
   A) a front wheel and two back wheels;
   B) a steering mechanism comprising handlebars and a head tube, said steering mechanism further comprising a fork mounted onto said front wheel;
   C) a vertical frame structurally connected to said head tube, said vertical frame comprises a levers hinge joint;
   D) a horizontal frame structurally connected to said vertical frame, said horizontal frame comprising a rear axle, said two back wheels are mounted onto said rear axle;
   E) two paddle levers that extend from a respective said levers hinge joint;
   F) a crankshaft structurally connected to said horizontal frame and said two paddle levers;
   G) a chain assembly interlocked with said rear axle, said two back wheels turn to create a forward motion when said crankshaft rotates said chain assembly; and
   H) a release mechanism to collapse said vertical frame from an upright position to a folded position.

2. The step-cycling apparatus set forth in claim 1, further comprising adjustable hydraulic pistons each comprising piston valves, said adjustable hydraulic pistons structurally connected to a piston stabilizer bar that is structurally connected to said horizontal frame.

3. The step-cycling apparatus set forth in claim 2, further characterized in that said vertical frame comprises horizontal bars linked together with a cross bar.

4. The step-cycling apparatus set forth in claim 3, further characterized in that said release mechanism comprises at least one U-shaped spring pin.

5. The step-cycling apparatus set forth in claim 4, further characterized in that once pressed, said at least one U-shaped spring pin releases said horizontal bars from said horizontal frame.

6. The step-cycling apparatus set forth in claim 5, further characterized in that said horizontal frame comprises a release channel.

7. The step-cycling apparatus set forth in claim 6, further characterized in that said horizontal bars comprise a frame hinge.

8. The step-cycling apparatus set forth in claim 7, further characterized in that once pressed, said at least one U-shaped spring pin releases said horizontal bars from said release channel to collapse said vertical frame from said upright position to said folded position, rotating along said frame hinge.

9. The step-cycling apparatus set forth in claim 2, further comprising foot-platforms that each mount on its respective of said two paddle levers.

10. The step-cycling apparatus set forth in claim 2, further characterized in that a supporting bar extends downwardly from said horizontal frame to said piston stabilizer bar.

11. The step-cycling apparatus set forth in claim 2, further characterized in that said piston valves regulate variable resistance to enable a user to adapt a step velocity/intensity in accordance with body weight or exercise intensity.

12. The step-cycling apparatus set forth in claim 1, further characterized in that said vertical frame is arched.

13. The step-cycling apparatus set forth in claim 9, further characterized in that said two back wheels turn to create said forward motion when a force is applied onto said foot-platforms, which in turn are each mounted on its respective of said two paddle levers, as said force is applied from a starting position, said force is transmitted to said adjustable hydraulic pistons, and to said crankshaft through a connecting rod, said crankshaft rotates said chain assembly, which is further interlocked with said rear axle.

14. The step-cycling apparatus set forth in claim 13, further characterized in that said crankshaft pushes each of said adjustable hydraulic pistons to said starting position in order for a cycle to start over and continue again.

15. The step-cycling apparatus set forth in claim 2, further characterized in that said piston valves regulate variable resistance for each said adjustable hydraulic pistons independently of one another.

16. The step-cycling apparatus set forth in claim 2, further characterized in that said adjustable hydraulic pistons are water hydraulics, multi-stage telescoping cylinders, an actuator configuration, a double-acting cylinder, or a double-end rod cylinder.

17. The step-cycling apparatus set forth in claim 2, further characterized in that said adjustable hydraulic pistons comprise directional control valves.

* * * * *